US006282795B1

(12) United States Patent
Poole et al.

(10) Patent No.: US 6,282,795 B1
(45) Date of Patent: *Sep. 4, 2001

(54) WALLPAPER SCARIFYING DEVICE

(75) Inventors: Daniel L. Poole, Phoenix; Robert N. Poole, Pinetop, both of AZ (US)

(73) Assignee: William Zinsser & Co., Incorporated, Somerset, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/395,035

(22) Filed: Sep. 13, 1999

Related U.S. Application Data

(63) Continuation of application No. 09/080,050, filed on May 15, 1998, now Pat. No. 5,950,312.

(60) Provisional application No. 60/049,918, filed on Jun. 18, 1997.

(51) Int. Cl.[7] ...................................................... A47J 13/08

(52) U.S. Cl. .................... 30/172; 15/236.06; 15/236.08; 29/81.17

(58) Field of Search .................. 30/169, 172; 15/236.01, 15/236.03, 236.06, 236.08, 236.1; 29/81.11, 81.17; 114/222

(56) References Cited

U.S. PATENT DOCUMENTS 4,592,108 * 6/1986 Svendsen .......................... 30/172 X

* cited by examiner

*Primary Examiner*—Douglas D. Watts
(74) *Attorney, Agent, or Firm*—Fay, Sharpe, Fagan, Minnich & McKee, LLP

(57) ABSTRACT

A wallpaper scarifying device including a plate and at least one scarifying assembly coupled to the plate. The scarifying assembly includes a swivel fixture rotatably coupled to the plate about an axis of rotation and rotatably carrying a cutting disk at an angle of less than 45 degrees relative a plane perpendicular to the axis of rotation. The cutting disk has a plurality of teeth extending from a periphery thereof.

24 Claims, 2 Drawing Sheets

FIG. 1
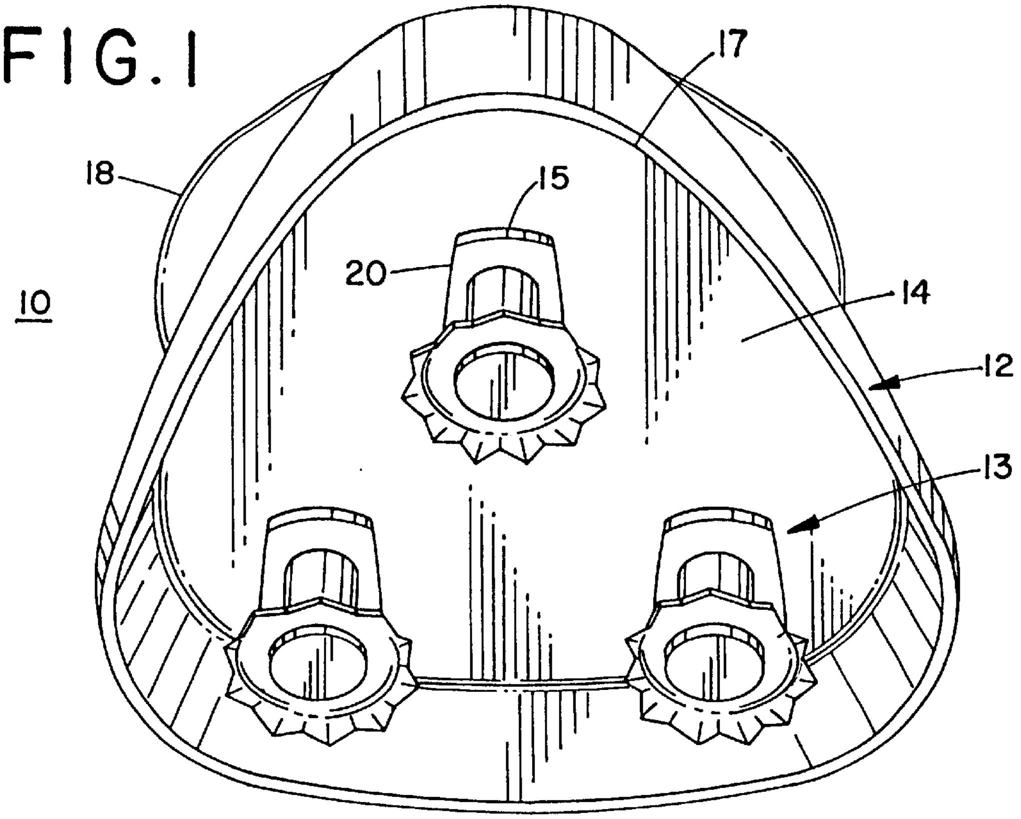
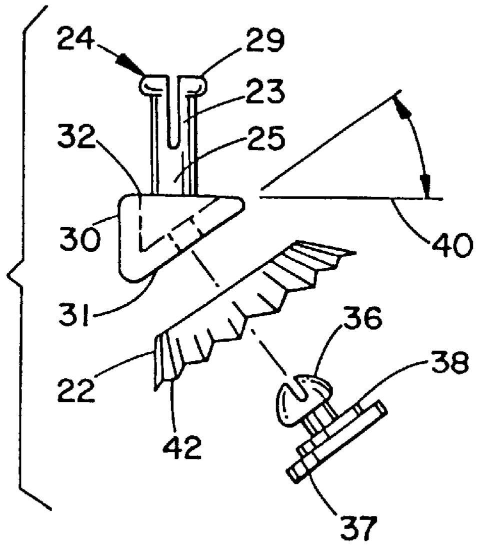
FIG. 3
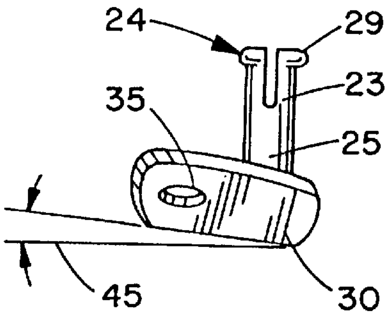
FIG. 4

WALLPAPER SCARIFYING DEVICE

This application is a continuation application of U.S. application Ser. No. 09/080,050, filed May 15, 1998, now U.S. Pat. No. 5,950,312 entitled WALLPAPER SCARIFYING DEVICE, which claimed the benefit of U.S. Provisional Application Serial No. 60/049,918, filed Jun. 18, 1997.

FIELD OF THE INVENTION

The present invention pertains to wallpapering tools. More specifically, the present invention concerns devices for scarifying wallpaper in a wallpaper removal process.

BACKGROUND OF THE INVENTION

One of the most difficult and time consuming tasks in interior decorating is changing or simply eliminating wallpaper. The process is so tedious many people often paper or paint over existing wallpaper. This however, is typically unacceptable as the results are less than ideal.

When removing wallpaper, if the adhesive can be softened, the paper can usually be easily peeled from the wall surface. Devices for weakening the adhesive include solutions, steam machines, spray bottles etc. Which attempt to penetrate the paper and reach the adhesive. Sometimes large quantities of solution can be used to soak the wallpaper, thus reaching the adhesive. Using large quantities of solution can, however, damage the wall and can be very messy. Furthermore, many types of wallpaper use materials which are water impermeable and cannot be soaked in this manner. These papers also present problems for steam machines.

The problem of penetrating wallpaper has been overcome by the development of perforators. Perforators are devices which tear or perforate the wallpaper permitting solutions to be applied to the adhesive through the perforations in the wallpaper. While effective, perforators can damage wall surfaces if not carefully handled, and their effectiveness is often reduced due to the small size of the perforations created.

It would be highly advantageous, therefore, to remedy the foregoing and other deficiencies inherent in the prior art.

Accordingly, it is an object of the present invention to provide a new and improved wallpaper scarifying device for perforating wallpaper.

Another object of the invention is to provide a new and improved wallpaper scarifying device which will not damage a wall surface.

And another object of the invention is to provide a new and improved wallpaper scarifying device which will provide relatively large perforations in wallpaper.

Still another object of the present invention is to provide a new and improved wallpaper scarifying device which is quick, efficient and easy to operate.

SUMMARY OF THE INVENTION

Briefly, to achieve the desired objects of the instant invention in accordance with a preferred embodiment thereof, provided is a wallpaper scarifying device for scarifying wallpaper on a surface including a plate, and at least one scarifying assembly. The scarifying assembly includes a swivel fixture rotatably coupled to the plate and rotatably carrying a cutting disk offset from an axis of rotation of the swivel fixture. The cutting disk has a plurality of teeth extending from a periphery thereof.

In a more specific embodiment, the swivel fixture carries the cutting disk at an angle of less than 45 degrees relative a plane perpendicular to the axis of rotation.

In a further embodiment, the swivel fixture includes a shaft having a first end rotatably coupled to the plate about the axis of rotation and a second end, and a base having a first surface coupled to the second end of the shaft and a second surface. The second surface is canted at an angle with respect to a plane perpendicular to the axis of rotation and substantially parallel to the surface to be scarified. The cutting wheel is coupled to and substantially parallel with the second surface.

In yet another embodiment, the base is coupled to the shaft at an angle with respect to the plane perpendicular to the axis of rotation. The angle is preferably approximately 5 degrees.

BRIEF DESCRIPTION OF THE DRAWINGS

FIG. 1 is a bottom perspective view of a scarifying device in accordance with the present invention;

FIG. 3 is an exploded view of a scarifying assembly; and

FIG. 4 is a side view of a swivel fixture.

DETAILED DESCRIPTION OF THE PREFERRED EMBODIMENT

Figure 2:
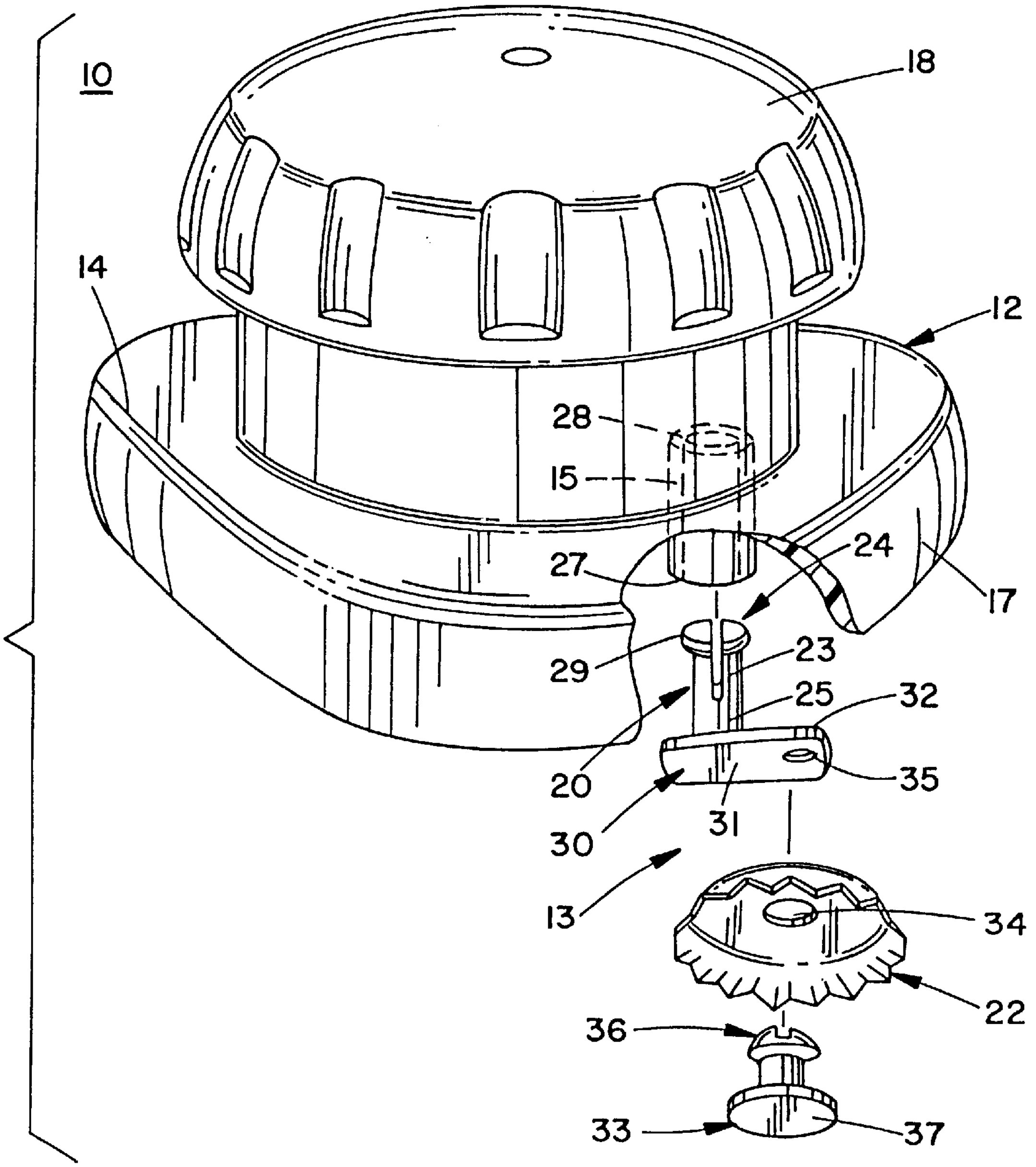
FIG. 2 is a side view of the device of FIG. 1 with a portion broken away and an exploded scarifying assembly.

Turning now to the drawings in which like reference characters indicate corresponding elements throughout the several views, attention is first directed to FIGS. 1 and 2 which illustrate a scarifying device generally designated 10 having a body 12 and at least one scarifying assembly 13 carried thereby. Body 12 includes a receiver plate 14 having a socket 15 for receiving scarifying assembly 13. In this preferred embodiment, three scarifying assemblies are received by three corresponding sockets. It will be understood by those skilled in the art that while three scarifying assemblies are shown, less than three or more than three scarifying assemblies can be provided.

A finger guard or skirt 17 extends from receiver plate 14 to protect the fingers of a user. If three or more scarifying assemblies 13 are employed, no skirt is necessary for use of device 10 other than for the protection of the user. If only one or two scarifying assemblies are used, the skirt acts as a balance to prevent extreme tipping of receiver plate 14. A handle 18 can be coupled to or integrally formed with receiver plate 14 for grasping by the user. However, the handle must be sufficiently spaced from the back surface of receiver plate 14 so as to permit sockets 15 to receive scarifying assemblies 13.

Referring specifically to FIG. 2, scarifying assembly 13 includes a swivel fixture 20 and a cutting disk 22. Swivel fixture 20 includes a shaft 23 having an end 24 and an opposing end 25. End 24 includes fastener elements for movably securing swivel fixture 20 within socket 15. In this embodiment, socket 15 is generally tubular in shape having opposing open ends 27 and 28. End 24 of swivel fixture 20 is bifurcated with the two furcations outwardly biased. Both furcations are received within open end 27. As shaft 23 is inserted into socket 15, end 24 emerges from open end 28 (not shown). Lips 29 on each furcation engage open end 28 preventing the withdrawal of shaft 23 without first moving the furcation inward against the bias to disengage lips 29 from open end 28.

Scarifying assembly 13 further includes a base 30 having a generally elongate shape with a front surface 31 and a back surface 32. End 25 of shaft 23 is coupled to base 30 on back surface 32 proximate one end and, and cutting disk 22 is rotatably coupled to base 30 on front surface 31 proximate an opposing end. Cutting disk 22 is rotatably coupled to base 30 by a plug 33 received concurrently through an opening 34 in disk 22 and an opening 35 in base 30. Plug 33 includes a bifurcated end 36 and an enlarged end 37. Bifurcated end 36 is biased in a manner similar to that described previously for end 24. Enlarged end 37 limits the insertion of plug 33. A bearing surface 38 is formed on plug 33 to facilitate the rotation of cutting disk 22.

Turning now to FIG. 3, surface 31 of base 30 is canted with respect to a generally horizontal axis 40. Axis 40 is generally parallel to the surface to be scarified. The cant in surface 31 translates to a cant in cutting disk 22. Furthermore, disk 22 includes a plurality of teeth 42 extending from the periphery thereof. Teeth 42 extend at an angle to the plane of the disk. In this manner, only one edge of disk 22 with corresponding teeth 42 engages the surface to be scarified at any one time. The degree of cant can vary depending on the angle of the teeth of the cutting disk, but is preferably approximately in a range of 20 to 30 degrees.

Referring to FIG. 4, it should also be noted that base 30 is attached to shaft 23 at an angle with respect to a line 45 perpendicular to shaft 23. The angle is preferably small, approximately 5 degrees, but may vary according to the angle of the teeth and surface 31.

In operation, the offset of disk 22 with respect to shaft 23 permits rotation of scarifying assembly 13 with respect to body 12. The angle of base 30 aids in the rotation of scarifying apparatus 13. The angle of cutting disk 22 causes teeth 42 on one side of disk 22 to perforate paper on a surface as they rotate forwardly, and tear out the back of the perforation as disk 22 continues to rotate. This is accomplished by a blade generally closer to horizontal than to vertical. Furthermore, since the teeth are not perpendicular, penetration is reduced, greatly decreasing the damage done to the surface underlying the material to be scarified.

Various changes and modifications to the embodiments herein chosen for purposes of illustration will readily occur to those skilled in the art. To the extent that such modifications and variations do not depart from the spirit of the invention, they are intended to be included within the scope thereof.

What is claimed is:

1. A wallpaper scarifying device for scarifying wallpaper on a surface, the scarifying device comprising:

a body;

a swivel fixture connected with the body and being rotatable relative to the body about an axis of rotation substantially parallel to the surface to be scarified; and, a cutting disk rotatable carried on the swivel fixture and offset from said axis of rotation of said swivel fixture, the swivel fixture including:

a shaft having a first end rotatably coupled to the plate about the axis of rotation and a second end; and, a base having a first surface coupled to the second end of the shaft and a second surface, the second surface being canted at an angle with respect to a plane perpendicular to said axis of rotation and substantially parallel to the surface to be scarified, the cutting wheel being coupled to and substantially parallel with said second surface.

2. The wallpaper scarifying device according to claim 1 wherein the cutting disk is carried at an angle of less than 45 degrees relative to a plane perpendicular to the axis of rotation.

3. The wallpaper scarifying device according to claim 1 wherein said angle of the cant is in the range of approximately 20–30 degrees.

4. The wallpaper scarifying device according to claim 1 wherein the base is coupled to the shaft at an angle with respect to said plane perpendicular to said axis of rotation.

5. The wallpaper scarifying device according to claim 4 wherein the base is coupled to the shaft at an angle of approximately 5 degrees.

6. A wallpaper scarifying device comprising:

a plate; and, at least one scarifying assembly, the at least one scarifying assembly including a swivel fixture rotatable coupled to the plate and including a base portion extending from an axis of rotation of the swivel fixture, the base portion rotatably carrying a cutting disk offset from said axis of rotation of the swivel fixture, the axis of rotation of said swivel fixture being substantially perpendicular to a plane defined by said plate, the swivel fixture including a shaft having a first end rotatably coupled to the plate about the axis of rotation and a second end, and said base including a first surface coupled to the second end of the shaft and a second surface, the second surface canted at an angle with respect to a plane perpendicular to the axis of rotation and substantially parallel to the surface to be scarified, the cutting disk coupled to and substantially parallel with the second surface.

7. A wallpaper scarifying device according to claim 6 wherein the cutting disk is carried at an angle of less than 45 degrees relative to a plane perpendicular to the axis of rotation.

8. A wallpaper scarifying device as claimed in claim 6 wherein the angle of the cant is in the range of approximately 20–30 degrees.

9. A wallpaper scarifying device according to claim 6 wherein the base is coupled to the shaft at an angle with respect to the plane perpendicular to the axis of rotation.

10. A wallpaper scarifying device according to claim 9 wherein the base is coupled to the shaft at an angle of approximately 5 degrees.

11. A wallpaper scarifying apparatus according to claim 6 wherein the plate further includes a socket for rotatably receiving the first end of the shaft.

12. A wallpaper scarifying device comprising:

a plate; and, at least one scarifying assembly coupled to the plate, the at least one scarifying assembly including a swivel fixture rotatably coupled to the plate about an axis of rotation substantially perpendicular to said plate, the swivel fixture rotatable carrying a cutting disk offset from said axis of rotation and at an angle of less than 45 degrees relative a plane perpendicular to the axis of rotation, the swivel fixture including:

a shaft having a first end rotatably coupled to the plate about the axis of rotation and a second end; and, a base including a first surface coupled to the second end of the shaft and a second surface, the second surface canted at an angle less than 45 degrees with respect to a plane perpendicular to the axis of rotation and substantially parallel to the surface to be scarified, the cutting wheel coupled to and substantially parallel with the second surface.

13. A wallpaper scarifying apparatus according to claim 12 wherein the plate further includes a socket for rotatably receiving the first end of the shaft.

14. A wallpaper scarifying device according to claim 12 wherein the angle of the cant is in the range of approximately 20–30 degrees.

15. A wallpaper scarifying device according to claim 12 wherein the base has a first end coupled to the second end of the shaft and a second end to which the cutting disk is coupled, offsetting the cutting disk from the axis of rotation of the swivel fixture.

16. A wallpaper scarifying device according to claim 15 wherein the base is coupled to the shaft at an angle with respect to the plane perpendicular to the axis of rotation.

17. A wallpaper scarifying device according to claim 16 wherein the base is coupled to the shaft at an angle of approximately 5 degrees.

18. A wallpaper scarifying device for scarifying wallpaper on a surface comprising:

a plate; and, a plurality of swivel fixtures, each of said plurality of swivel fixtures being rotatably coupled to said plate and rotatably carrying a cutting disk offset from an axis of rotation of the respective swivel fixture, the axes of rotation of each of said plurality of swivel fixtures being substantially perpendicular to a plane defined by said plate.

19. A wallpaper scarifying device according to claim 18 wherein each cutting disk is carried by a respective swivel fixture of said plurality of swivel fixtures at an angle of less than 45 degrees relative to a plane perpendicular to the axes of rotation of the respective swivel fixture.

20. The wallpaper scarifying device according to claim 18 wherein each swivel fixture of said plurality of swivel fixtures includes:

a shaft having end rotatably coupled to the plate about an axis of rotation and a second end; and, a base having a first surface coupled to the second end of the shaft and a second surface, the second surface canted at an angle with respect to a plane perpendicular to the axis of rotation and substantially parallel to the surface to be scarified, the cutting wheel coupled to and substantially parallel with the second surface.

21. The wallpaper scarifying device according to claim 20 wherein the angle of cant of each second surface is in the range of 20–30 degrees.

22. The wallpaper scarifying device according to claim 20 wherein the base of each swivel fixture is coupled to the shaft of the respective swivel fixture at an angle with respect to said plane perpendicular to the axis of rotation of the respective swivel fixture.

23. The wallpaper scarifying device according to claim 22 wherein each base of the plurality of swivel fixtures is coupled to the shaft of the respective swivel fixture at an angle of approximately 5 degrees.

24. The wallpaper scarifying device according to claim 20 wherein said plate further includes a plurality of sockets for rotatably receiving the first end of each shaft of said plurality of swivel fixtures.

* * * * *